United States Patent
McDowell et al.

[15] 3,667,165
[45] June 6, 1972

[54] CONDITIONING GRINDER

[72] Inventors: Philip R. McDowell; Charles W. Vekovious, both of Downsview, Ontario, Canada

[73] Assignee: G & B Automated Equipment Limited, Downsview, Ontario, Canada

[22] Filed: Feb. 16, 1971

[21] Appl. No.: 115,364

[52] U.S. Cl.....................................51/35, 51/93, 51/165.77
[51] Int. Cl.............................................................B24b 7/02
[58] Field of Search........................51/35, 93, 165 R, 165.77

[56] References Cited

UNITED STATES PATENTS

| 1,996,467 | 4/1935 | Ernst | 51/165.77 X |
| 3,113,405 | 12/1963 | Schneider | 51/165 R |
| 2,726,490 | 12/1955 | Lowe | 51/165.77 X |
| 3,089,287 | 5/1963 | Dilks | 51/35 |

*Primary Examiner*—Harold D. Whitehead
*Attorney*—Peter Kirby, Charles P. Curphey and Norris M. Eades

[57] ABSTRACT

A travelling carriage carrying a motor driven grinding wheel at the end of a pivoted arm reciprocates back and forth along a steel slab workpiece. A hydraulic cylinder forces the wheel down against the workpiece, this downward movement being controlled in accordance with the power being supplied to the motor and the speed of reciprocating travel of the carriage. Control of the contact pressure of the wheel is thus based on the power being absorbed by the motor, which ensures a substantially constant rate of work output by the wheel. These conditions prevail during carriage travel at normal speed. When the carriage slows down to change direction at the ends of its reciprocal travel, a mechanism sensing the carriage speed reduces the rate of work output of the grinding wheel to obtain a more constant value for the work output per unit distance of travel, the result being more uniformity in the depth of cut. Provision is made for indexing the arm transversely of the workpiece at each end of carriage travel. The maximum magnitude of the acceleration and deceleration of the carriage at the travel ends is limited in order to increase the comfort of an operator seated on the carriage. The grinding wheel peripheral speed is kept constant by a radioactive source and detector system that measures wheel diameter and speeds up the motor as the wheel wears. To facilitate this speed control a D.C. motor is used. As an alternative to a moving carriage, the structure carrying the grinding wheel can be stationary, the workpiece holder then reciprocating, the same controls over the grinding wheel pressure being exercised.

8 Claims, 16 Drawing Figures

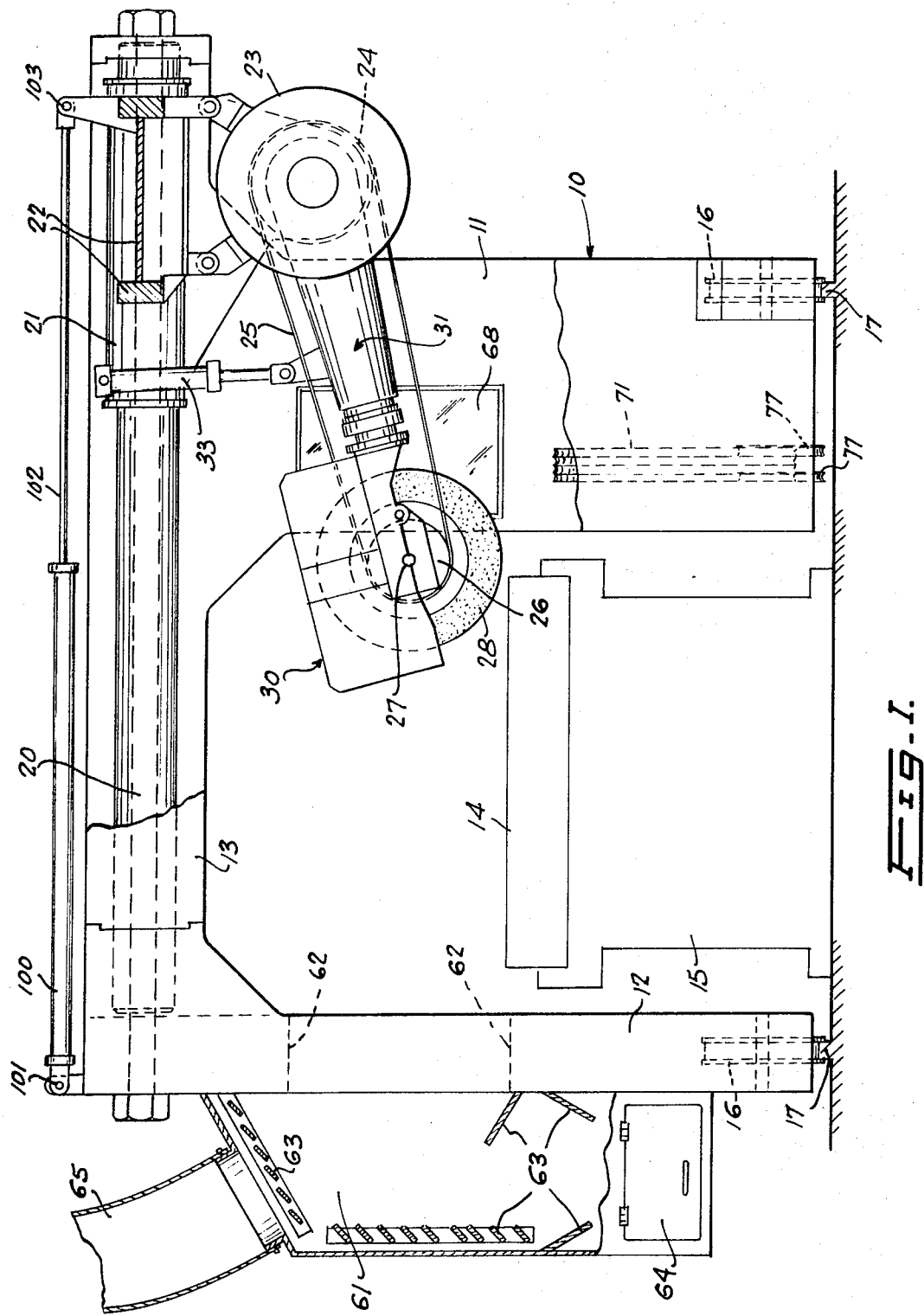

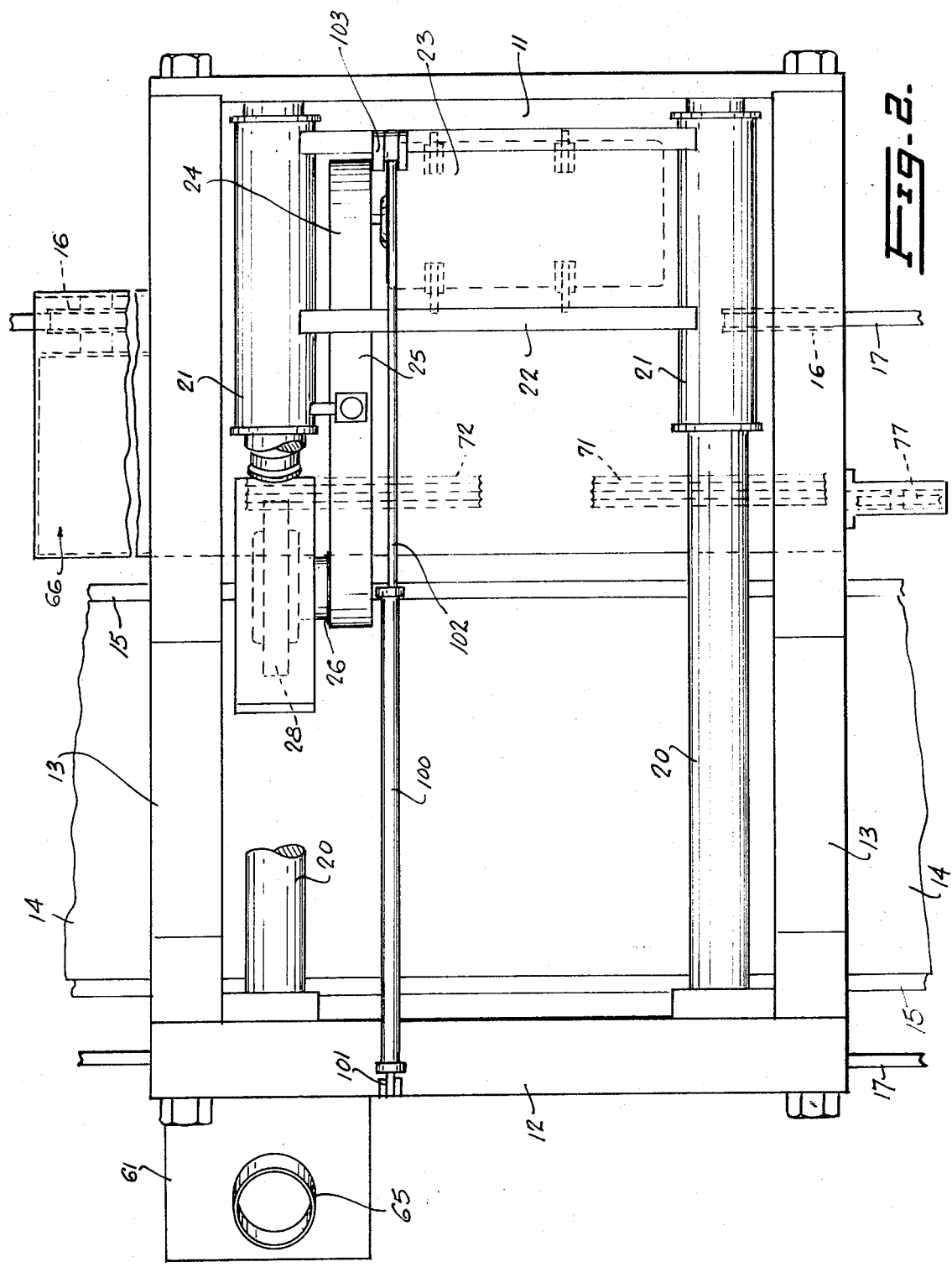

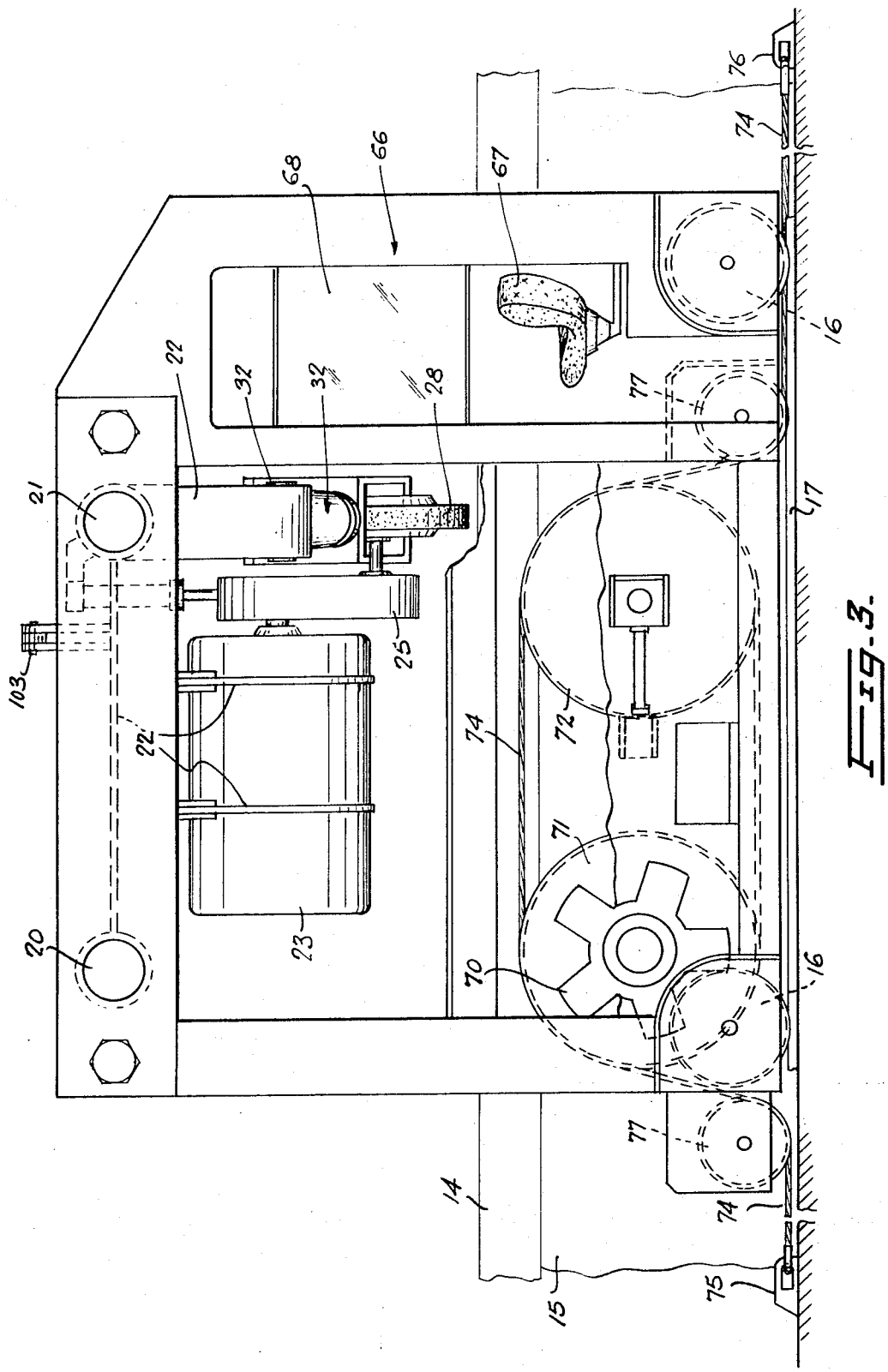

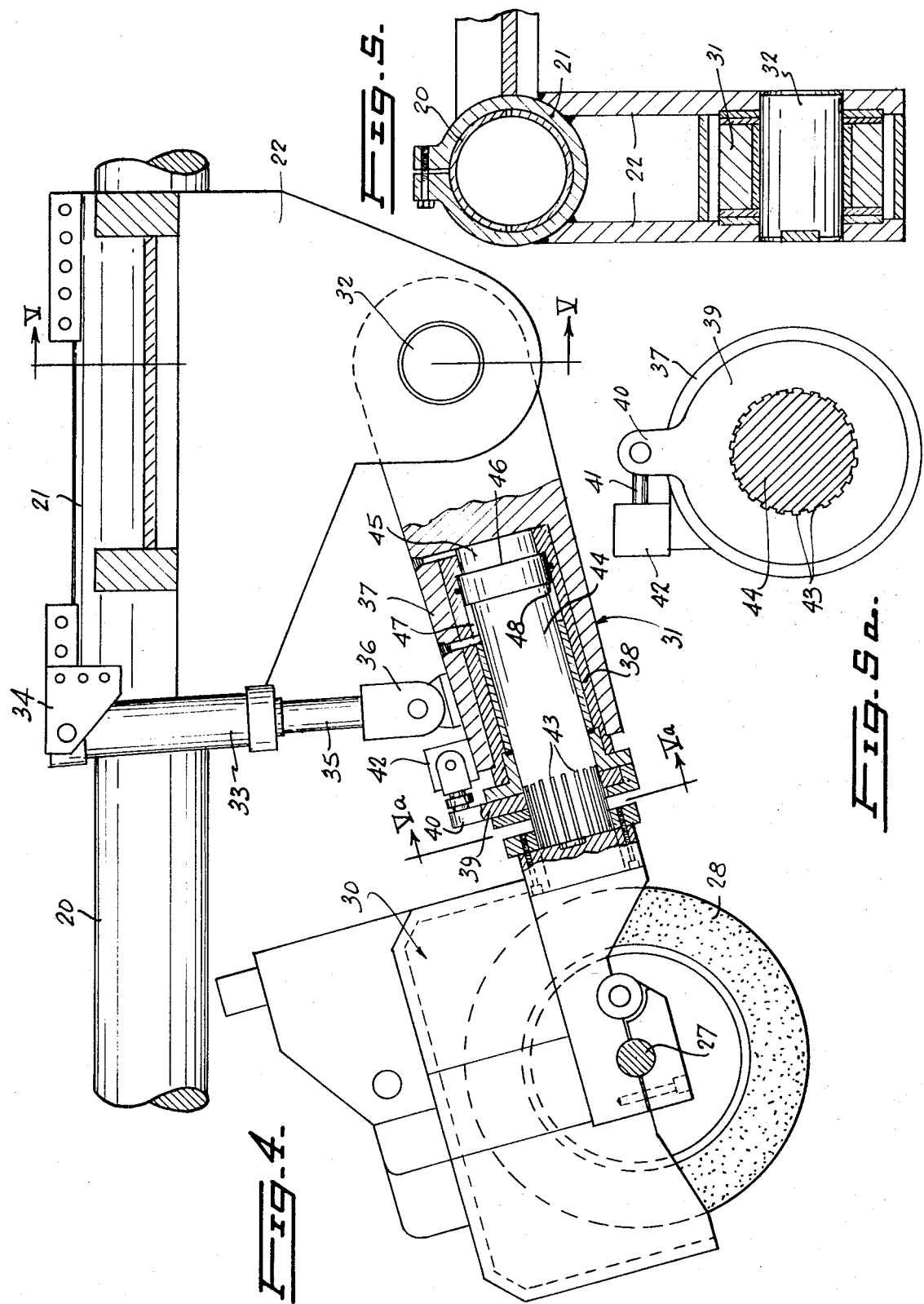

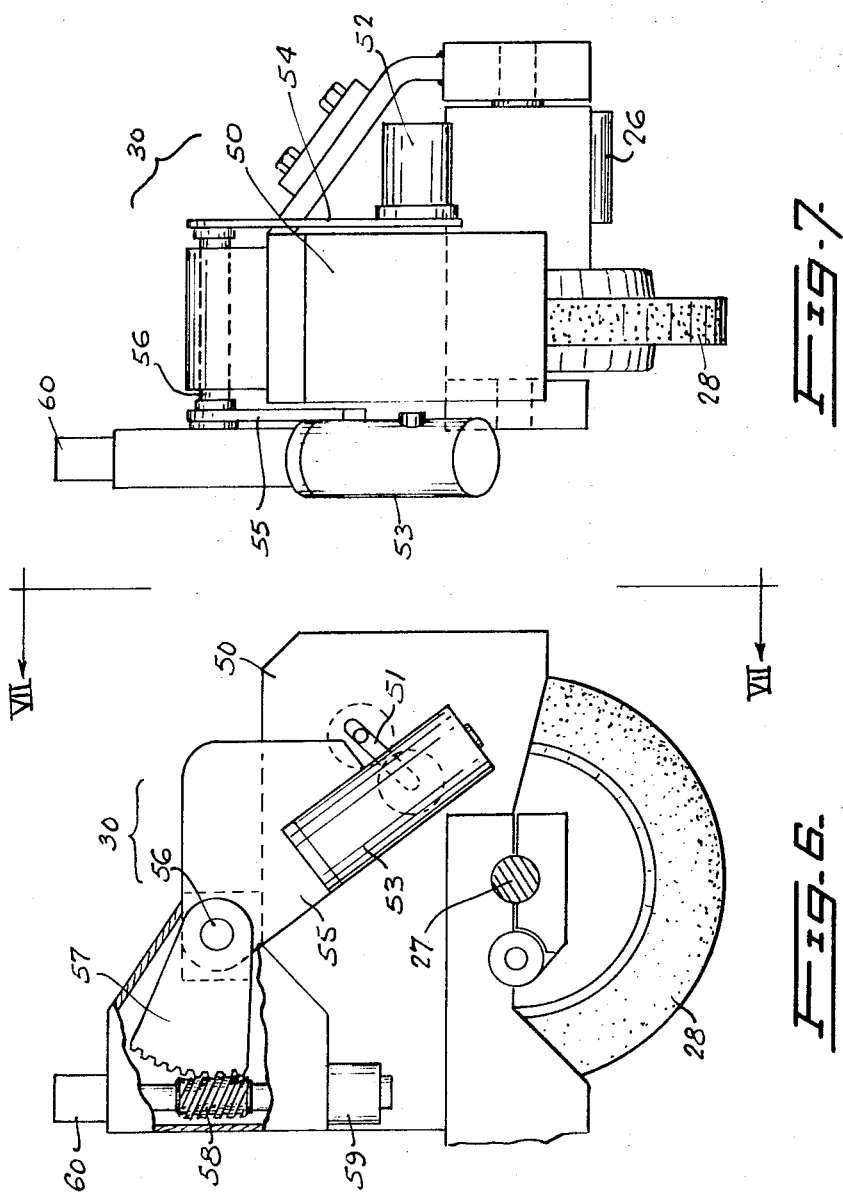

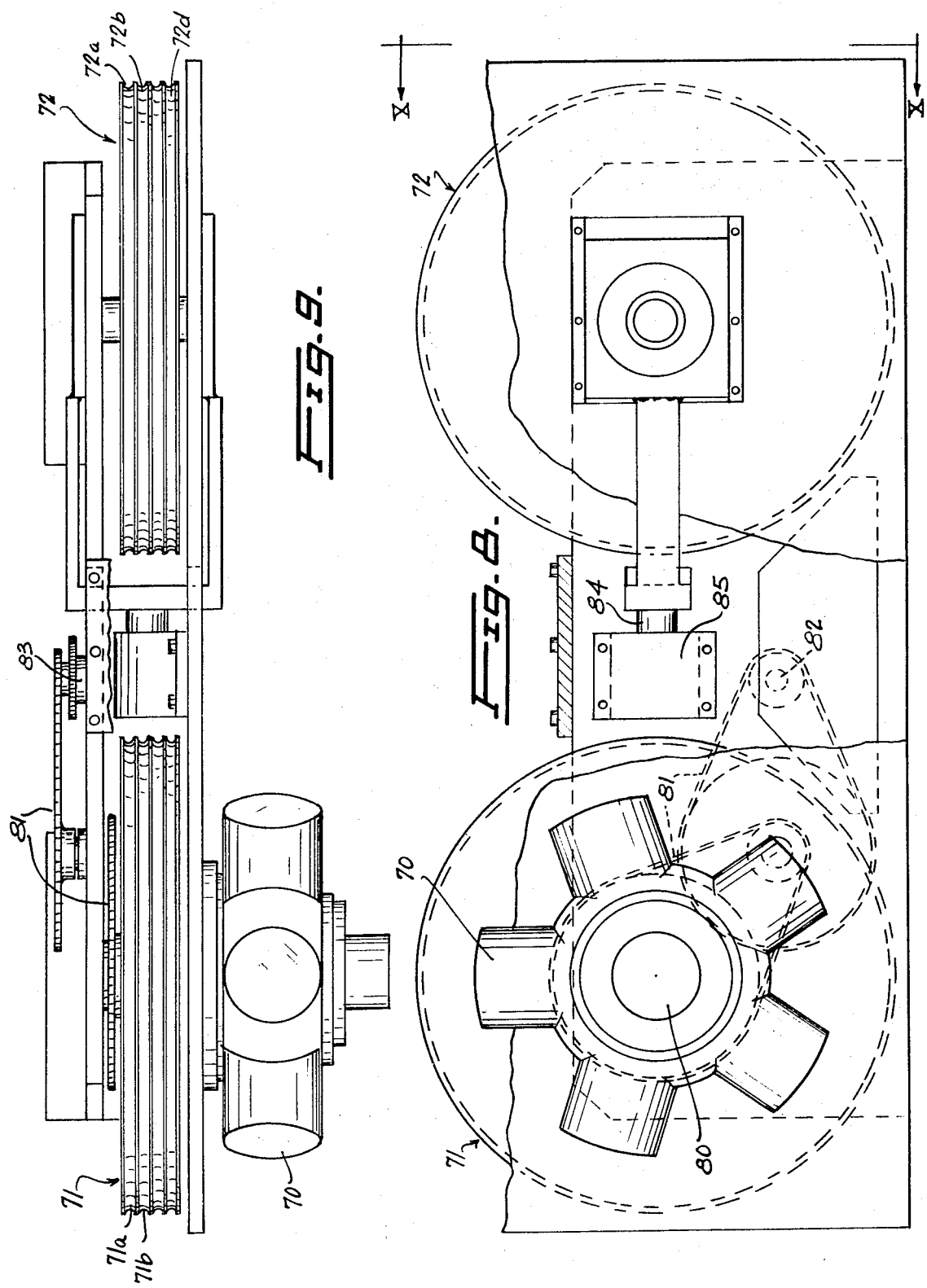

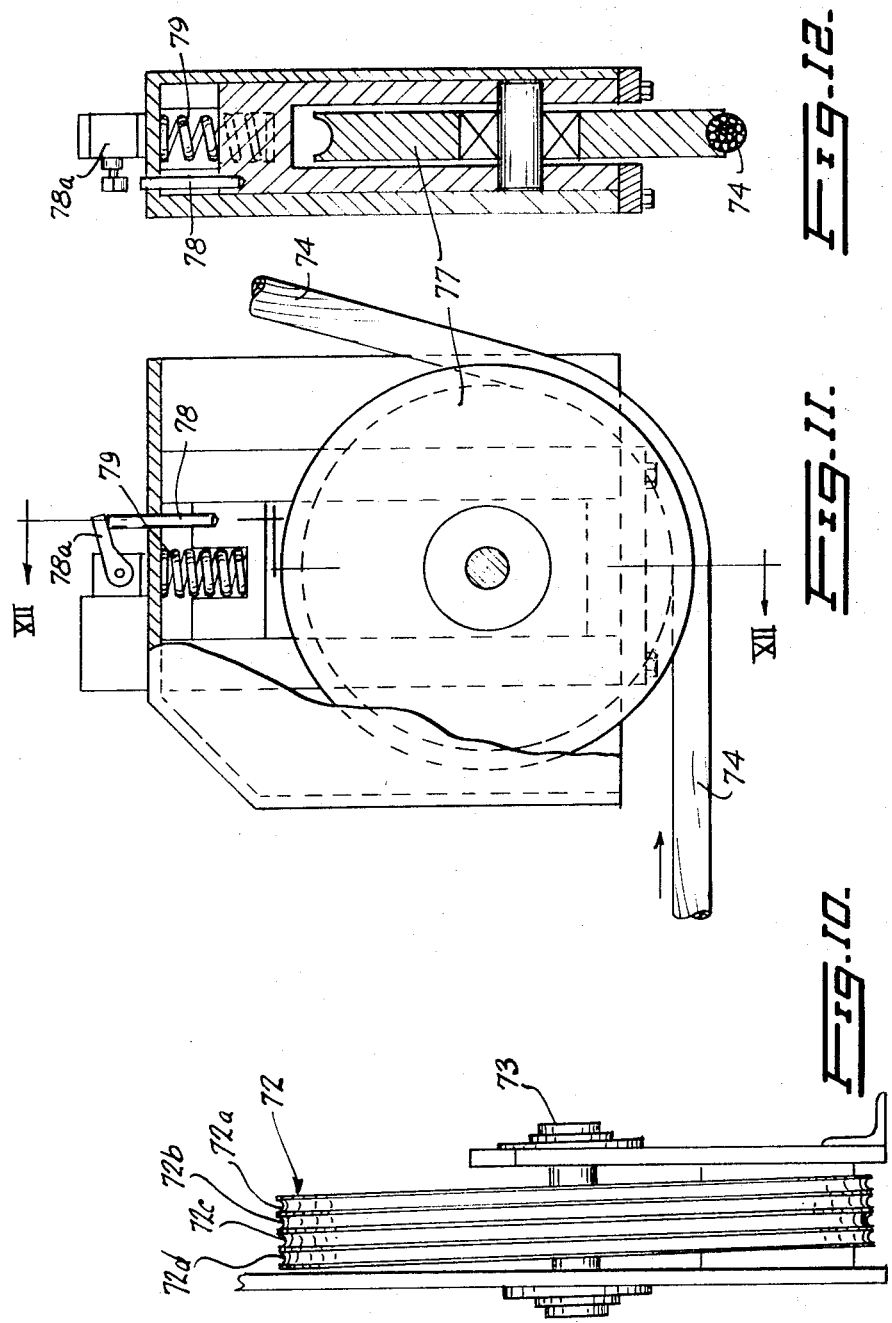

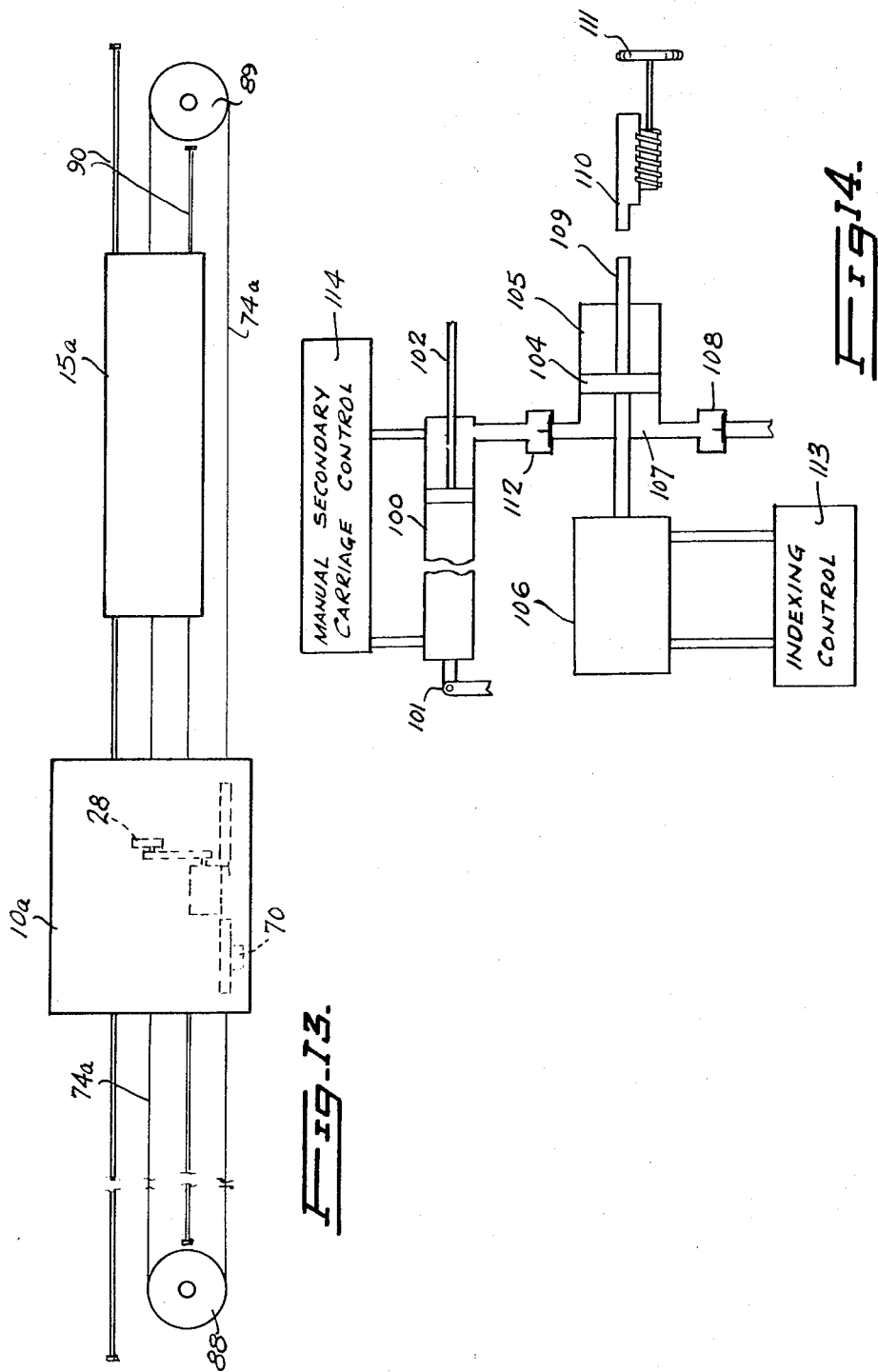

CONDITIONING GRINDER

This invention relates to improvements in a conditioning grinder, i.e., a grinding machine for use in a mill, such as a steel mill, for removing scale and/or other imperfections from the surface of a billet, slab or other workpiece.

The object of the present invention is to provide a conditioning grinder that will remove from the workpiece a surface layer the thickness of which can be more accurately controlled so as to be more uniform throughout the surface of the workpiece, than has been possible with previous conditioning grinders. For example, it may be desired to remove a surface layer of a thickness of one thirty-second of an inch. Circumstances will vary and it may at times be required that a thicker or a thinner layer be removed. However, removal of more metal than is strictly required represents significant wastage. This is especially true when the workpiece is a slab of one of the expensive specialty steels, such as stainless steel or a tool steel.

One of the difficulties with prior conditioning grinders has been that, in order to ensure at least the required depth of cut throughout the entire surface of the workpiece, it has been necessary to accept the disadvantage of taking an excessive depth of cut in parts of the surface. In other words, control of the depth of cut over the various parts of the surface has been relatively crude.

The principal object of the present invention is to provide a machine in which this control is improved, with the obvious advantage of minimization of wastage of workpiece material.

One of the specific difficulties experienced with prior grinders has been a tendency for the grinding wheel to remove an excessive amount of metal near the ends of the workpiece when the relative travel between the wheel and the workpiece slows down. It is conventional in conditioning grinders for the grinding wheel to be reciprocated back and forth along the work. For this purpose the workpiece holder can be reciprocated beneath a stationary assembly containing the grinding wheel and its drive mechanism, or the workpiece can be held in a stationary holder with the grinding wheel mounted on a reciprocating carriage. There will also be provision for indexing the grinding wheel across the workpiece on successive longitudinal passes of the wheel in order to take a similar cut from each portion of the workpiece surface.

When the workpiece is massive, it is convenient to adopt the alternative mentioned above, namely to use a fixed workpiece with a reciprocating carriage carrying the grinding wheel. It will be desirable to reciprocate the grinding wheel accurately between the two ends of the workpiece, i.e., not to miss each extreme end portion, or, on the other hand, to pass beyond either of these ends. The wheel will be urged against the workpiece with substantial pressure, so that it would tend to "drop off" the workpiece, if taken beyond the end. There would then be risk of damage, if the direction of travel were immediately reversed. Difficulty in maintaining automatically the necessary control for such an accurate registration of the grinding wheel and the workpiece ends, has been experienced in prior grinders, and it is a further object of the present invention to provide improvements in this regard.

It is also known in grinding machines to make provision for sensing the wear of the wheel and for maintaining its peripheral linear speed substantially constant by increasing the motor speed as the wheel wears. Such arrangements have not proved entirely satisfactory in operation, however, and it is a still further object of the present invention to provide improvements in regard to the reliability of such mechanisms for sensing wheel wear.

Yet another object of the present invention is to provide a conditioning grinder in which the operations are carried out in a highly automated manner, thus speeding production and minimizing the results of operator errors.

Other features and advantages of the machine will be apparent from the specific description below.

One form of grinder constructed in accordance with the various features of the present invention is illustrated in the accompanying drawings. It is to be understood that this machine is illustrated by way of example only, and not by way of limitation of the broad scope of the invention, which broad scope is defined in the appended claims.

In the drawings:

FIG. 1 is an end view of the machine, with various casing and other parts cut away for clarity of illustration;

FIG. 2 is a plan view of the machine seen in FIG. 1, again with certain parts cut away;

FIG. 3 is a side view of the machine, as seen from the right hand side of FIG. 1;

FIG. 4 is an enlarged view of the grinding wheel arm, also with certain parts cut away to show interior structure;

FIG. 5 is a section on the line V—V in FIG. 4;

FIG. 5a is a section on the line Va—Va in FIG. 4;

FIG. 6 is a further fragmentary view showing details of the grinding wheel assembly;

FIG. 7 is a section on the line VII—VII in FIG. 6;

FIG. 8 is an elevation view of the carriage drive assembly with the cable omitted;

FIG. 9 is a plan view of FIG. 8;

FIG. 10 is a view taken on the line X—X in FIG. 8;

FIG. 11 is a fragmentary view showing a guide roll;

FIG. 12 is a section on the line XII—XII in FIG. 11, except that the parts are in a different position;

FIG. 13 is a small scale plan view illustrating an alternative arrangement;

FIG. 14 is a diagram showing the manner of actuation of an indexing cylinder.

GENERAL CONSTRUCTION

Figure 15:
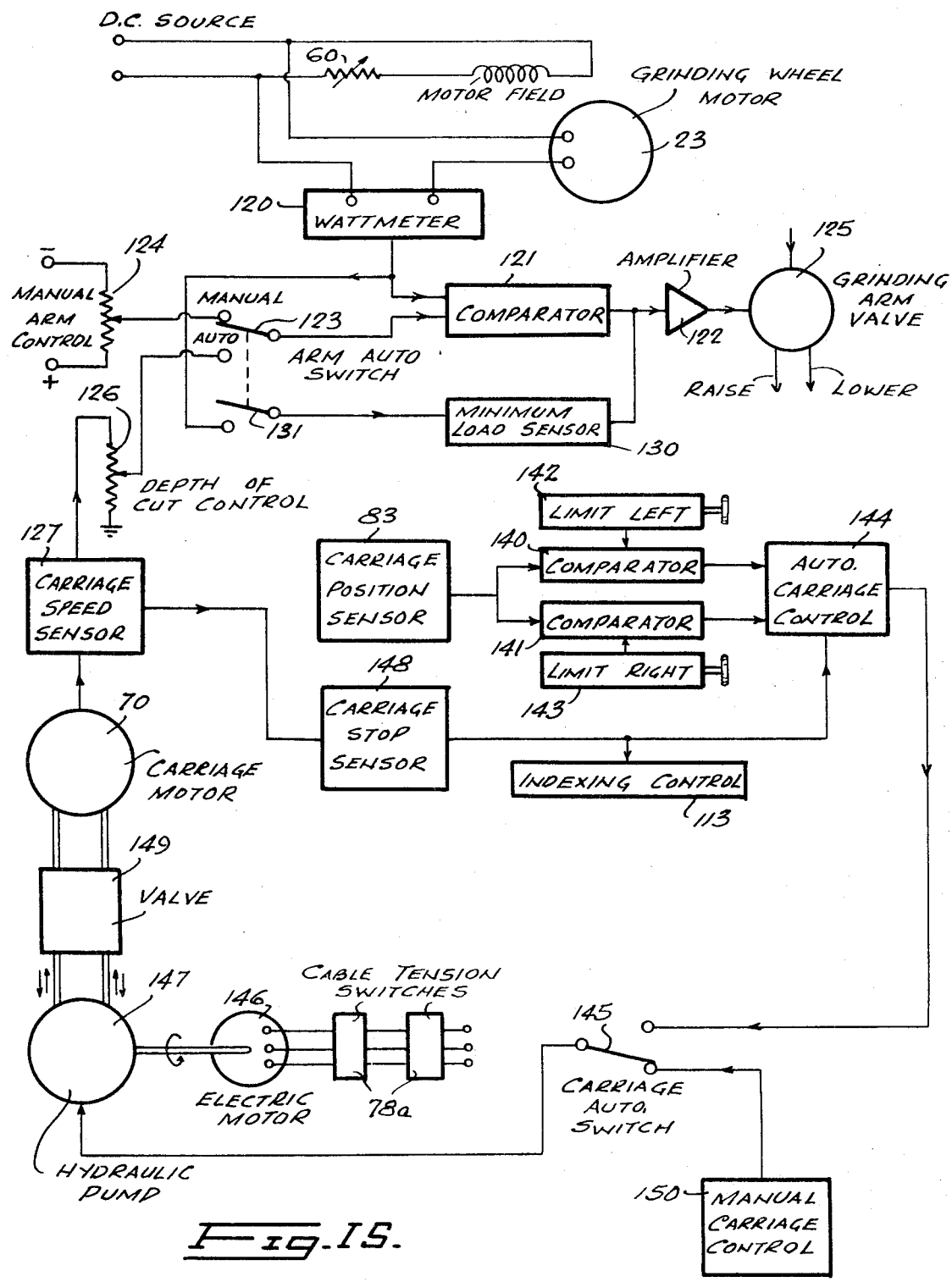
FIG. 15 is a general schematic circuit diagram.

Firstly with reference to FIGS. 1 to 3, it will be noted that the machine comprises a main structure in the form of a main carriage 10 having a main assembly 11 connected to a remote assembly 12 by means of a pair of overhead beams 13. The assemblies 11 and 12 and the beams 13 together define an archway extending over a space in which a workpiece slab 14 is shown located on a fixed table 15. The carriage 10 is mounted on flanged wheels 16 running on fixed rails 17.

Extending across the archway is a pair of fixed rods 20 on which respective sleeves 21 are slidably mounted. The sleeves 21 serve to support between them a secondary carriage 22 from which a D.C. electric motor 23 is suspended. The shaft of the motor 23 drives a pulley 24 from which a belt 25 drives to a further pulley 26 that is mounted on a shaft 27 of a grinding wheel 28.

GRINDING WHEEL ARM

As best seen from FIGS. 4 and 5, the shaft 27 of the grinding wheel 28 is journalled in a grinding wheel assembly 30 that is mounted on the end of a grinding wheel arm 31 pivotally supported by a pin 32 from the secondary carriage 22.

Control of pivotal movement of the arm 31 about the pin 32 is exercised by a hydraulic cylinder 33 one end of which is pivotally mounted on a sleeve 21 by a bracket 34. The piston 35 of this cylinder 33 is secured by a pivotal bracket assembly 36 to a main outer member 37 of the arm 31.

Rotatably mounted within an open end of the arm member 37 is an inner sleeve 38 secured to a plate 39 having a projection 40 connected to the piston 41 of a further hydraulic cylinder 42 mounted on the arm member 37. This cylinder effects rotation of the plate 39 through a limited angle each side of the central position shown in FIG. 5a. This rotation is transmitted through splines 43 on an inner arm member 44, the outer end of which supports the grinding wheel assembly 30. The operator is thus able to rock the grinding wheel through a limited angle to take care of any special workpiece conditions. In normal automatic operation the wheel will be centered, i.e., with the axis of the shaft 27 horizontal.

Limited longitudinal movement of the inner arm member 44 relative to the main arm member 37 is achieved by the admission of hydraulic fluid either to a space 45 to act on an end surface 46 of the inner arm member 44 to force the same outwards, or to an annular space 47 to act on a rear surface 48 of the arm member 44 to retract the same. This longitudinal travel of the grinding wheel assembly 30 serves the purpose of relaxing or applying tension in the belt 25, as required for maintenance or to take up any stretching of the belt.

GRINDING WHEEL ASSEMBLY

More details of the grinding wheel assembly 30 are shown in FIGS. 6 and 7. This assembly includes a casing 50 covering the portion of the grinding wheel 28 remote from that which projects into contact with the workpiece. In opposite sides of the casing 50 is a pair of aligned slots 51 extending radially in relation to the shaft 27. A radioactive source 52, of Krypton, for example, and a compatible radioactive detector 53, e.g., a tungsten wire, are mounted respectively on arms 54 and 55 that are both secured to a pin 56 pivotally mounted in the casing 50. Connected to the arm 55 is a gear tooth segment 57 that meshes with a worm wheel 58 driven by a motor 59. The purpose of this arrangement is to detect wear in the diameter of the wheel 28. Radiation from the source 52 sensed by the detector 53 energizes the motor 59 to rotate the assembly towards the radially inward position shown in FIG. 6.

As soon as the radiation is obscured from the detector by the edge of the grinding wheel 28, the motor 59 is de-energized. The parts remain in the position acquired until subsequent wheel wear again reveals the source to the detector. A potentiometer 60 mounted on the shaft of the motor 59 provides the necessary sensing of the extent to which the mechanism has tracked inwardly, and hence an indication of the amount of wear from the wheel 28. This information is employed to vary the field strength and hence the speed of the motor 23 (see FIG. 15) so as to maintain the linear speed of the grinding wheel periphery substantially constant.

Use of a radioactive system increases the reliability of detection. The assembly 30 is subjected to substantial vibration in service, and the air is thick with swarf, i.e., flying, hot fragments of metal and grinding wheel material. Detection systems using light or ultrasonic beams have proved unsatisfactorily reliable under these adverse conditions.

SWARF COLLECTOR

Most of the swarf generated by the wheel is thrown into a swarf collector 61 trough an aperture 62 in the assembly 12. Baffles 63 tend to deposit the solid material in a tray that can be removed through a door 64. Air is sucked out through a conduit 65 which is connected by suitable flexible piping to a source of suction and to further filtering and air cleaning apparatus (not shown).

OPERATOR's S

On the other side of the apparatus, that is in the main assembly 11, there is provided an operator's cab 66 with a seat 67, controls (not shown) and shatterproof windows 68 on three faces of the cab. These provide the operator with a field of view extending in both directions along the line of reciprocation of the carriage, i.e., along the rails 17, as well across the machine towards the grinding wheel and the swarf collector. The operator is very close to the grinding wheel to facilitate visual monitoring of the operation thereof.

CARRIAGE RECIPROCATION

The main carriage 10 is reciprocated along the rails 17 by a capstan assembly shown mainly in FIGS. 3 and 8 to 10. This assembly consists of an hydraulic capstan motor 70, the shaft of which drives a multi-groove sheave 71. A similar multi-groove sheave 72 is mounted as an idler on a slightly inclined shaft 73 (see FIG. 10). As shown in FIG. 3, a cable 74 extends under tension between a pair of fixed anchors 75 and 76. At each end of the machine the cable 74 enters by passing under a grooved idler pulley 77, details of which are shown in FIGS. 11 and 12. The pulley 77 is urged downwardly by a spring 79 to press against the cable 74. Should there be a loss of tension in the cable, one or both of the pulleys will be permitted to move downwardly as shown in FIG. 11, a pin 78 moving down to release a switch 78a to signal a loss of cable tension and stop the operation of the motor 70.

Entering the machine from the left hand side of FIG. 3 the cable 74, after passing under the pulley 77, enters a first groove 71a of the sheave 71 and extends across to engage the top of a corresponding groove 72a of the sheave 72. Because of the tilt of the sheave 72, when the cable leaves the groove 72a at the bottom of the sheave, it is now aligned with the second groove 71b of the sheave 71. Since the sheave 71 is not tilted the bottom and top locations of the groove 71b are aligned with each other, so that the cable, after passing 180° around the sheave 71, emerges in alignment with the upper location of groove 72b. This passing of the cable 74 back and forth between the sheaves, with 180° engagement at each turn, continues until finally the cable engages momentarily in the upper location of the fourth groove 72d of sheave 72 finally to extend under the right hand pulley 77 to the anchor 76.

The cable tension is maintained by a piston 84 in a hydraulic cylinder 85, the piston 84 acting to urge the sheave 72 away from the sheave 71.

This type of capstan drive is an improvement over those previously employed in grinders, in which the power for effecting travel of the carriage has been conveyed through the wheels engaging the rails. The latter method of driving is prone to slippage, with consequent inaccuracies both in the speed of travel and in the exact location of the carriage. To facilitate increased automation of the machine it is important to be able to reciprocate the carriage accurately between two limit positions that correspond to the ends of the workpiece. This need in turn requires reliable information as to the location of the carriage at any instant, as well as the ability to control its speed, acceleration and deceleration without introduction of errors that might arise from such extraneous causes as slippage caused by a patch of oil on a rail. The present form of capstan motor and drive mechanism provides this reliability, the shaft 80 of the motor 70 and sheave 71 being connected by chain gearing 81 to a shaft 82 of a potentiometer 83 that provides an accurate electrically indication of the position of the carriage at all times.

ALTERNATIVE OF RECIPROCATED WORKPIECE

FIG. 13 illustrates an alternative arrangement in which the main structure 10a of the grinder is fixed. A capstan motor 70 and sheave assembly, as before, drives a cable 74a which passes around idler rollers 88 and 89 at each end of a track 90, along which a workpiece holder 15a can be reciprocated by means of the cable 74a, the two ends of which are secured to said holder. This arrangement provides essentially the same relative reciprocation between the grinding wheel and the workpiece in the first horizontal direction, i.e., the direction along the workpiece, as does the arrangement of FIGS. 1 to 12.

TRANSVERSE INDEXING OF GRINDING WHEEL

Indexing of the grinding wheel relative to the workpiece in the other horizontal direction perpendicular to said first direction takes place at the end of each successive longitudinal reciprocation. This effect is achieved by means of an indexing hydraulic cylinder 100 (FIGS. 1 and 2) that is fixed to the remote assembly 12 at 101 and has a piston 102 connected at 103 to the secondary carriage 22. The piston 102 is shown extended in the drawings. It will be apparent that withdrawal of the piston 102 will cause the carriage 22 to slide on the rods 20 from right to left, moving the grinding wheel arm 31 and hence the wheel 28 itself transversely across the workpiece. The cylinder 100 is actuated as illustrated diagrammatically in FIG. 14. A piston 104 in a measuring cylinder 105 is driven to the right by a control cylinder 106 to draw oil into a chamber 107 through a non-return valve shown diagrammatically at 108. The amount of oil drawn into the chamber 107 is limited by the travel of the piston rod 109 which strikes a stop 110, the position of which is adjustable by a hand wheel 111. Reversal of the control cylinder 106 will cause the measured amount of oil drawn into the chamber 107 to be forced out again through a non-return valve 112 and into the cylinder 102, thus indexing the secondary carriage 22 across the workpiece by the desired small amount. The control cylinder 106 is actuated by an indexing control 113 in accordance with the general circuit explained below. A manual secondary carriage control 114 can exercise overriding control over movement of the piston 102.

OPERATION:GRINDING WHEEL MECHANISM

The general control circuits are shown diagrammatically in FIG. 15.

A wattmeter 120 is connected in the supply to the armature of the D.C. motor 23, the field of which is energized through the potentiometer 60 for the speed control purpose already explained. The wattmeter 120 provides an analogue output in the form of a voltage that increases linearly with the power being used by the motor 23. This voltage is fed to one input of a comparator 121, the output of which supplies the input of a control amplifier 122. The comparator 121 receives a second input from an auto switch 123. Assuming this auto switch to be in the Manual position shown, it receives a voltage from a potential divider 124 which serves as the manual head control. The comparator 121 compares its two inputs, the voltage received from the switch 123 representing a datum or predetermined level of power required to be expended by the grinding motor 23, this datum being set manually by the divider 124. If the motor 23 is working harder than the set level, the comparator 121 will energize the amplifier 122 to actuate a grinding arm displacement valve 125 to raise the piston 35 of the cylinder 33 that controls the grinding wheel arm. Raising of the grinding wheel to reduce its depth of cut into the workpiece will reduce the load on the motor. Conversely, too light a load, if detected by the comparator, will energize the head valve 125 to lower the grinding wheel arm.

When the operator moves the switch 123 over to Auto, the datum input to the comparator 121 is supplied from the adjustable arm of a depth of cut potential divider 126 that will have been already adjusted to the desired setting. This datum level will remain constant so long as the diver 126 continues to be energized with a steady potential from a carriage speed sensor 127, e.g., a tachometer connected to the carriage motor 70. Reduction of the speed of the carriage at each end of each reciprocation, when changing direction, will, however, cause a corresponding reduction in the datum level, with a consequent reduction in the downward displacement of the grinding wheel arm and hence in the rate of work output by the grinding wheel motor required to balance the comparator. Ideally, this rate of work output, i.e., grinding work per unit time, should be reduced approximately linearly with speed to produce instead a substantially constant work output per unit distance of travel. This should result in an even depth of cut being taken along the full length of the workpiece, thus avoiding the excess depth of cut that has been experienced in prior art machines at the ends when the speed of travel has had to be reduced to change direction.

In practice, whether a closely constant work output per unit distance of travel is achieved, or not, will depend largely on the tolerances built into the machine. It is therefore desired to stress that the present invention is not restricted to machines that exactly achieve this desirable end. The essential feature of the present invention resides in the fact that, by virtue of making the grinding arm displacement control dependent on the carriage speed, as well as on the motor load, an additional facility has been added. The prime utility of such additional facility is the ability to achieve a greater uniformity in the grinding depth of cut taken throughout the surface of the workpiece.

An example of a respect in which the grinding arm displacement may not be varied exactly linearly with carriage speed arises at the instant the carriage stops to reverse direction, i.e., when the speed is zero. To avoid the grinding wheel being raised completely from the workpiece surface at this moment, the output of the carriage speed sensor can be arranged never to fall below a small, minimum level. Similarly, provision may be made in the choice of the circuit constants to allow for windage and friction losses in the motor and drive, i.e., the difference between the power measured by the wattmeter 120 and that actually delivered at the grinding wheel surface.

A minimum load sensor 130 receives the output from the wattmeter 120 through contacts 131 of the auto switch, which are closed when in the Auto mode. If this output reaches a certain low value indicative of virtually no work output at the wheel, as may occur if the grinding wheel has accidentally passed beyond the end of the workpiece, the sensor 130 overrides the comparator 121 to cause the amplifier 122 to raise the grinding arm. The operator must then take over and correct the situation in temporary Manual operation.

OPERATION:CARRIAGE

The potentiometer 83 already described constitutes a carriage position sensor. Its output feeds to a pair of comparators 140 and 141 that also receives signals from respective right and left adjustable limit devices 142 and 143. To set up the operation, the operator will track the carriage in manual control to each limit position required. These limit positions will normally be when the grinding wheel is just at each end of the workpiece. He will then adjust the respective limit device to produce balance in its associated comparator, as indicated by a meter incorporated therein. Each comparator 140, 141 will include a bias so that the comparator will yield a characteristic output signal on each subsequent occasion when the carriage approaches within a selected distance of the limit position set by the operator, this selected distance being that required for smooth deceleration of the carriage.

The outputs from the comparators 140, 141 energize an auto carriage control 144 which, when a carriage auto switch 145 is in the Auto mode, controls a rotary hydraulic pump 147 driven from an A.C. squirrel-cage induction motor 146. The pump 147 powers the carriage motor 70. The volume of oil available from the pump 147 is thus externally adjustable and from the initiation of deceleration by the control 144, this external adjustment is stroked from the full oil volume coming from one port of the pump, through zero, to the same volume now coming from the opposite port of the pump. This stroking arrangement allows variable volume producing speeds from zero to maximum in either direction. The rate that the pump volume is thus externally varied will control the rate of acceleration or deceleration. During deceleration, the carriage motor 70 acts as a prime mover in an attempt to run the electrical motor 146 over its synchronous speed, as determined by the line frequency and its number of poles. Once this occurs, the motor 146 acts as an induction generator and regenerates the carriage energy into the AC line. A valve 149 is provided for use basically as a shut-off valve and a pump by-pass valve for emergency stop conditions. As soon as the carriage stops, a signal from the carriage speed sensor 127 is received in a carriage stop sensor 148 which energizes the carriage control 144 to reverse the direction of oil flow from the pump 147 to accelerate the carriage motor 70 smoothly (again with a maximum value of acceleration) up to full carriage speed in the opposite direction.

The sensor 148 also simultaneously actuates the indexing control 113 (FIG. 14) which moves the piston 104 to the left to cause the piston 102 to index the grinding wheel arm transversely of the workpiece. The indexing control 113 immediately returns the piston 104 as far as it will go to the right to await a subsequent actuation, which will occur when the carriage stops momentarily at the other end of its travel. When the carriage auto switch is in the Manual mode, control of the carriage is exercised by conventional circuits in a manual carriage control 150.

We claim:
1. A conditioning grinder comprising
   a. a main structure,
   b. a workpiece holder,
   c. an arm movably mounted on said main structure,
   d. a grinding wheel mounted on said arm,
   e. displacement means acting between said structure and said arm to move the wheel in a displacement direction into and out of grinding contact with a surface of a workpiece mounted on said holder,
   f. an electric motor connected to the grinding wheel for driving the same,
   g. means for effecting relative movement between said structure and the workpiece holder in a first direction of extent of the workpiece surface to travel along the workpiece surface, said first direction being substantially perpendicular to said displacement direction,
   h. first sensing means for sensing the power absorbed by said motor,
   i. second sensing means for sensing the speed of said travel,
   j. and control means connected to said first and second sensing means and to said displacement means for moving the grinding wheel towards the workpiece surface in response to reduction of said power below a predetermined level and for moving the grinding wheel away from said workpiece surface in response to increase of said power above said predetermined level, and for reducing said predetermined level upon reduction of said speed whereby to render the work output of the grinding wheel per unit distance of travel more nearly constant.

2. A grinder according to claim 1, wherein said means for effecting relative movement between the structure and the workpiece holder comprises
   k. means for effecting reciprocation of the grinding wheel back and forth along the workpiece between a pair of extreme positions corresponding to ends of the workpiece.

3. A grinder according to claim 2, wherein said main structure includes
   l. a secondary structure on which said arm is movably mounted and
   m. means for moving said secondary structure stepwise relative to the remainder of the main structure in a second direction of extent of the workpiece surface, said second direction being substantially perpendicular both to said first direction and to said displacement direction whereby to index the grinding wheel across the workpiece upon successive reciprocations thereof.

4. A grinder according to claim 2, wherein the workpiece holder is stationary and the main structure comprises a carriage including wheels for engaging fixed rails, the grinder further including
   l. a cable extending between fixed points at opposite ends of said rails,
   m. a capstan motor mounted on said carriage,
   n. and sheaves drivingly engaging the cable and driven by said capstan motor for positive driving of said carriage.

5. A grinder according to claim 4, including,
   o. means supplying power to said capstan motor for alternately driving the same in opposite directions for effecting said reciprocation of the grinding wheel along the workpiece,
   p. and means for limiting the magnitude of acceleration and deceleration of said capstan motor.

6. A grinder according to claim 2, wherein the main structure is stationary and the workpiece holder comprises a carriage including wheels for engaging fixed rails, the grinder further including
   l. a cable having ends connected to respective ends of said carriage,
   m. a capstan motor mounted on said structure,
   n. and sheaves drivingly engaging the cable and driven by the capstan motor for positive driving of said carriage.

7. A grinder according to claim 1, including
   k. third sensing means mounted on said arm for sensing the diameter of the grinding wheel,
   l. and further control means connected to said third sensing means and to the electric motor for increasing the rotational speed thereof inversely with said diameter whereby to maintain a substantially constant linear speed at the periphery of said wheel.

8. A grinder according to claim 7, wherein said third sensing means comprise
   m. a radioactive source located on one side of the wheel,
   n. a detector for energization by and aligned with said source on the other side of the wheel,
   o. means for moving said source and detector radially of the wheel,
   p. means connected to said detector for actuating said moving means to move the source and detector radially inwardly until the source is obscured from the detector by the grinding wheel,
   q. and means for transmitting the position of said moving means to said further control means.

* * * * *